United States Patent
Fan et al.

(10) Patent No.: US 9,386,018 B2
(45) Date of Patent: Jul. 5, 2016

(54) DISTRIBUTED CRYPTOGRAPHY SYSTEM

(71) Applicant: Hangzhou Dianzi University, Hangzhou (CN)

(72) Inventors: Lingyan Fan, Hangzhou (CN); Shi Wang, Hangzhou (CN); Chris Tsu, Saratoga, CA (US)

(73) Assignee: HANGZHOU DIANZI UNIVERSITY, Hangzhou (CN)

( * ) Notice: Subject to any disclaimer, the term of this patent is extended or adjusted under 35 U.S.C. 154(b) by 130 days.

(21) Appl. No.: 14/251,561

(22) Filed: Apr. 11, 2014

(65) Prior Publication Data

US 2015/0295928 A1  Oct. 15, 2015

(51) Int. Cl.
*H04L 29/06* (2006.01)
*G06F 21/00* (2013.01)
*G06F 21/60* (2013.01)
*G06F 9/46* (2006.01)

(52) U.S. Cl.
CPC .............. *H04L 63/0869* (2013.01); *G06F 9/46* (2013.01); *G06F 21/00* (2013.01); *G06F 21/602* (2013.01); *H04L 63/0435* (2013.01); *H04L 63/0876* (2013.01)

(58) Field of Classification Search
CPC .......................... H04L 9/0844; G06F 21/602
See application file for complete search history.

(56) References Cited

U.S. PATENT DOCUMENTS

| | | | | |
|---|---|---|---|---|
| 5,796,836 A | * | 8/1998 | Markham | H04L 9/0637 380/28 |
| 6,484,257 B1 | * | 11/2002 | Ellis | H04L 63/0272 380/279 |
| 2002/0076052 A1 | * | 6/2002 | Yung | H04L 9/002 380/277 |
| 2006/0224713 A1 | * | 10/2006 | Imai | H04L 63/062 709/223 |

OTHER PUBLICATIONS

Cachin, Christian. "Distrinuted Cryptography" ETHZ, Winter 2006/07.*
Minsky, Yaron, et al. "Cryptographic support for fault-tolerant distributed computing." Proceedings of the 7th workshop on ACM SIGOPS European workshop: Systems support for worldwide applications. ACM, 1996.*

* cited by examiner

*Primary Examiner* — Shawnchoy Rahman
(74) *Attorney, Agent, or Firm* — Maryam Imam; IPxLaw Group LLP

(57) ABSTRACT

A card reader controller engine includes an interface controller responsive to information. The engine is coupled to the interface controller and is configured to compress the information before the information is to be stored in a memory card. A master interface is coupled to the engine and is further responsive to the compressed information for storage in the memory card.

17 Claims, 8 Drawing Sheets

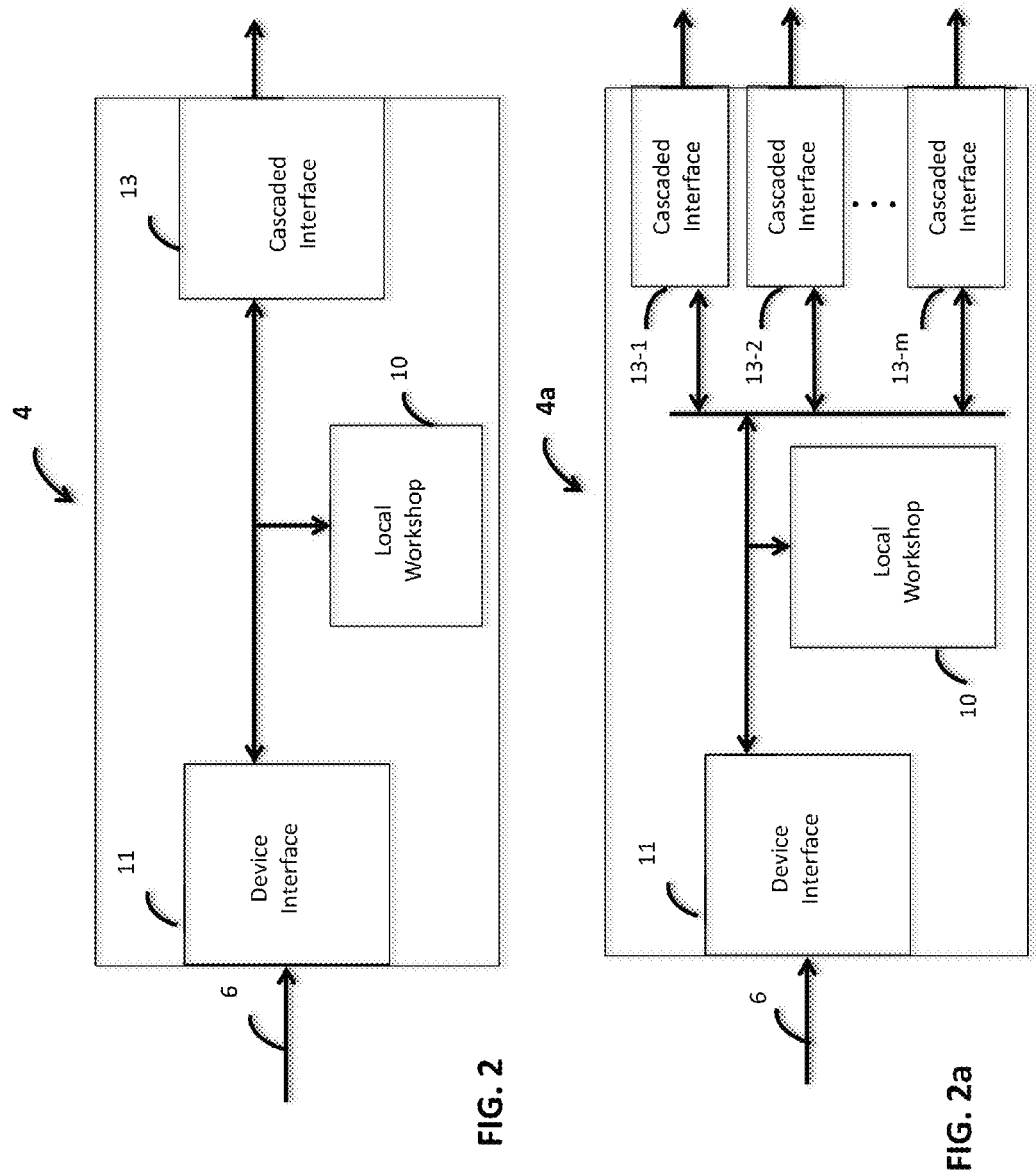

DISTRIBUTED CRYPTOGRAPHY SYSTEM

FIELD OF THE INVENTION

Various embodiment of the invention relate generally to cryptography engines and more particularly to distributed cryptography systems and accelerators.

BACKGROUND

Cryptography is utilized in numerous and various applications requiring manipulation of digital data. In most, if not all, such applications, such as storage and networking to name a couple among many others, latency and speed are not commodities. Rather, performance is quite valuable particularly due to the fast-improving nature of digital technology resulting in faster and faster components and therefore systems. Latency is undesirable in applications utilizing cryptography.

Accordingly, there is a need for cryptography systems with higher performance and latency.

SUMMARY

Briefly, a distributed cryptography system coupled to a host and configured to perform cryptography tasks initiated by the host. The distributed cryptography system comprises one or more working knots. One of the plurality of working knots is in communication with the host and performs one or more cryptography tasks and forwards the remaining cryptography tasks to another one of the working knots. The working knots include crypto engines and are operable to perform the cryptography tasks such as symmetric encryption.

A further understanding of the nature and the advantages of particular embodiments disclosed herein may be realized by reference of the remaining portions of the specification and the attached drawings.

BRIEF DESCRIPTION OF THE DRAWINGS

FIG. 2 shows a working knot, in accordance with an embodiment of the invention.

FIG. 2a shows another example of working knot, in accordance with another embodiment of the invention.

DETAILED DESCRIPTION OF EMBODIMENTS

Particular embodiments and methods of the invention disclose a distributed cryptography system having a plurality of working knots capable of perform cryptography. One of the working knots is in communication with a host and receives cryptography tasks. It performs one or more of the tasks and forwards the remaining tasks to another one of the working knot.

The following description describes a distributed cryptography system. The cryptography system employs a plurality of working knots, each working knot capable of performing cryptography tasks and forwarding the host data to another working knot if it is busy, as discussed below.

Figure 1:
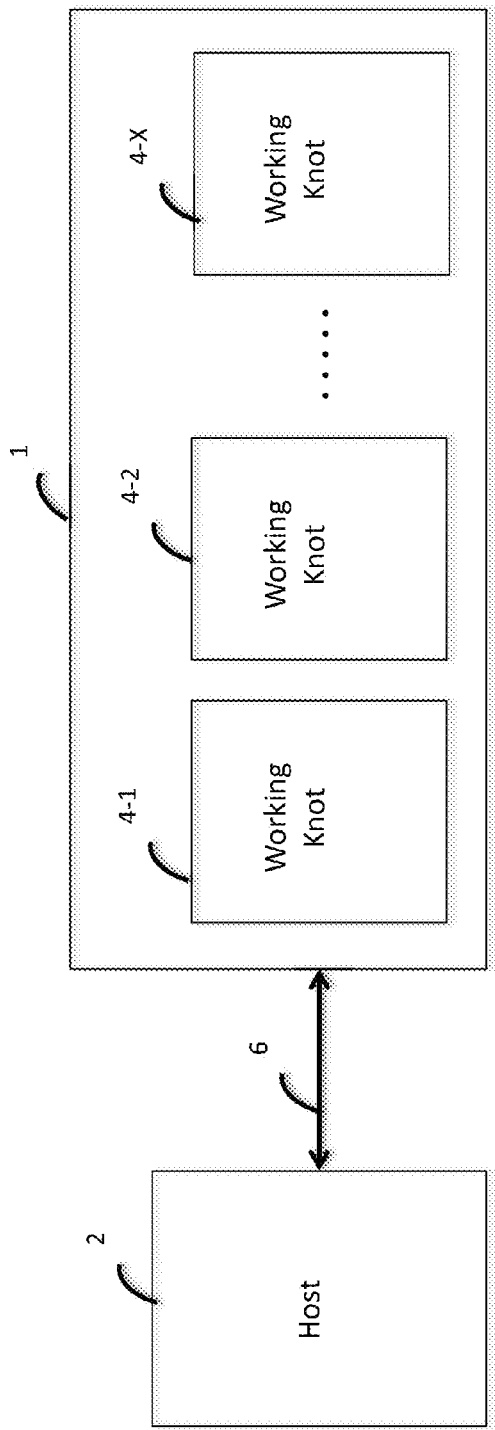
FIG. 1 shows a distributed cryptography system, in accordance with an embodiment of the invention.

Referring now to FIG. 1, a distributed cryptography system 1 is shown, in accordance with an embodiment of the invention. The distributed cryptography system 1 is shown coupled to a host 2 via an interface 6. The system 1 is further shown to include an 'X' number of working knots 4; working knots 4-1 through 4-X, 'X' being an integer value.

One or more of the working knots 4 is in communication with the host 2 through the interface 6. The working knot that is communicating with the host 2 receives cryptography tasks, along with cryptography task associated data, from the host 2. The working knot in receipt of the cryptography tasks from the host 2 maintains one of the cryptography tasks, or keeps as many cryptography tasks as it can immediately perform, and forwards the remaining cryptography tasks to an adjacent working knot. The adjacent working knot might do the same depending on the number of cryptography tasks and the number of working knots. Thus, the remaining working knots perform cryptography on some of the cryptography tasks while the remaining cryptography tasks flow through to the cascaded working knots. Accordingly, each of the working knots that receives one or more of the remaining cryptography tasks, performs a cryptography process, such as but not limited to encryption/decryption, immediately. Thus, the cryptography tasks are performed, at least in part, in parallel (or substantially concurrently) with the distribution of the cryptography tasks to the working knots. Clearly, performance and efficiency are increased as a result. Stated differently, while one or more cryptography tasks are performed by a working knot, the remaining cryptography tasks are forwarded through the working knots to be performed by another one of the working knots that is capable of performing the task immediately.

As can be appreciated, the cryptography system 1 has many applications, too numerous to list, one such example is by an encryption accelerator card used in banks to perform security transactions. In most applications, the host 2 is the task initiator and the cryptography system 1 is the performer of the cryptography tasks.

Figure 1A:
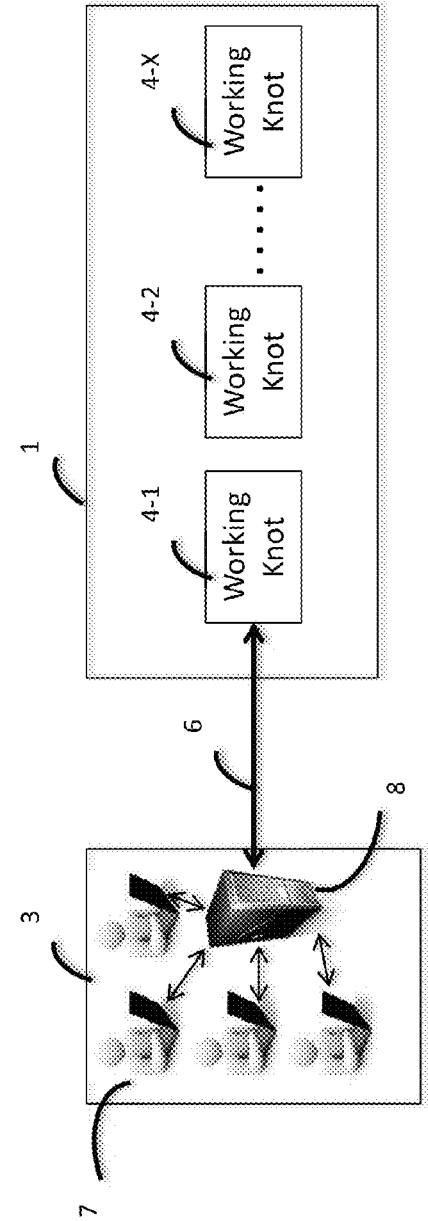
FIG. 1a shows an example of an application of the distributed cryptography system 1, in accordance with an embodiment of the invention.

In an embodiment of the invention, the interface 6 is a Universal Serial Bus (USB) or a Peripheral Component Interconnect Express (PCIe)-compatible bus, or any other suitable bus. In an embodiment of the invention, the host 2 is PC, SUN Server, IBM mainframe and so on. FIG. 1a shows an example of an application of the distributed cryptography system 1, in accordance with an embodiment of the invention. The distributed cryptography system 1 is shown in use at a bank 3; the bank 3 being an example of the host 2. The bank 3 is shown to include a number of users 7; such as bank tellers and bank employees, with each of the users 7 being in communication with a bank server 8 for performing various banking transactions.

In FIG. 1a, the server 8 is shown to be coupled with the distributed cryptography system 1 and in communication with the working knot 4-1. The working knot 4-1 receives all of the cryptography tasks initiated by the users 7. The working knot 4-1 then performs cryptography on one or more of the received cryptography tasks and forwards the rest of the tasks to working knot 4-2; the working knot 4-2 performs similarly, and so on. FIG. 2 shows further details of the working knot 4, in accordance with an exemplary embodiment of the invention. The working knot 4 is shown to include a device interface 11, a local workshop 10 and a cascaded interface 13. The device interface 11 is shown coupled to the cascaded interface 13 of another working knot 4 and to a local workshop 10. While not shown in FIG. 2, the device interface 11 is further coupled to the host 2 of FIG. 1.

In some embodiments, the device interface 11 may be PCIe, SATA, SAS, IEEE1394, SD, eMMC or SPI-compliant. As used herein "compliant" refers to adherence to an industry standard, as defined by an industry-adopted specification.

The device interface 11 receives cryptography tasks form the host 2 and either forwards them to the local workshop 10, assuming the local workshop 10 is not busy performing other cryptography tasks, or forwards the tasks to the cascaded interface 13. While not shown in FIG. 2, the cascaded interface 13 is coupled to the device interface 11 of an adjacent working knot. In situations where the local workshop 10 is busy, the cascaded interface 13 forwards the task(s) and their associated data to another one of working knots in an effort to accelerate performance of the tasks. As such, the cryptography tasks issued by the host 2 are performed at a much faster rate in a distributed cryptography system 1 (shown in FIG. 1).

Examples of cryptography tasks in addition to symmetric encryption and decryption include but are not limited to digital signature, digital certificate, hashing functions, asymmetric encryption and decryption. The number of working knots in the distributed cryptography system depends on the number of the cryptographic tasks issued by the host and required throughput expected by the host 2.

FIG. 2a shows a working knot 4a, in accordance with an exemplary embodiment of the invention. The working knot 4a is shown to include 'm' number of cascaded interfaces 13; cascaded interfaces 13-1 through 13-m, 'm' being an integer value. The cascaded interfaces 13-1 through 13-m are all shown coupled to the device interface 11. The local workshop 10 is shown coupled to the cascaded interfaces 13-1-13-m as well as to the device interface 11.

The device interface 11 forwards host cryptography tasks and their associated data (cryptography tasks generated by the host 2), received through the interface 6, to 'm' number of working knots. The working knot 4a is analogous to the working knot 4 with the exception that working knot 4a has 'm' number of cascaded interfaces 13-1 through 13-m and can be in communication with 'm' number of other working knots at a given time (or concurrently).

A working knot being in communication with 'm' number of other working knots allows speedy transfer of the host cryptography tasks—and their associated data to more than one working knots substantially concurrently, therefore increasing the performance of the distributed cryptography system 1.

In some embodiments, the speed of the interface from the device interface 11 to the 'm' number of cascaded interfaces 13 and to the first working knot, such as one coupled to the cascaded interface 13-1 is orders of magnitude faster than like remaining interfaces to the remaining working knots. This is due to the working knot that is in communication with the host having to be fast enough to receive all tasks whereas, the remaining working knots typically do not have the same oblication. In an embodiment of the invention, the device interface 11 includes a PCIe-compatible device controller or USB-compatible device controller and the interface 6 is a PCIe-compatible bus or USB-compatible. In another embodiment of the invention, the cascaded interface 13 is a PCIe-compatible host controller or USB-compatible host controller.

Figure 3:
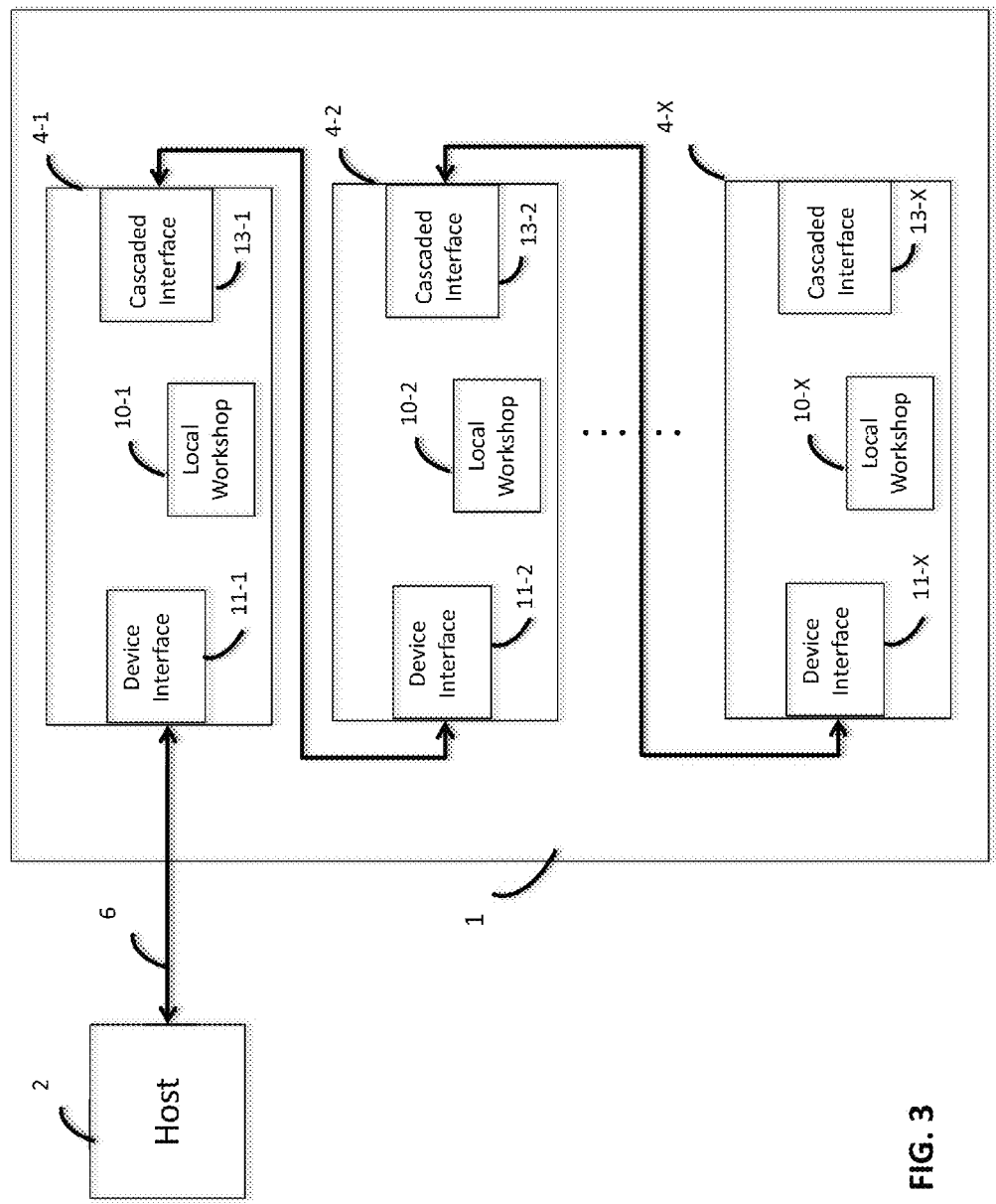
FIG. 3 shows an example of distributed cryptography system, in accordance with another embodiment of the invention.

FIG. 3 shows an example of a method and apparatus of the distributed cryptography system 1 employing working knots 4. The distributed cryptography system 1 is shown to include 'X' number of working knots 4-1 through 4-X coupled to one another in a cascaded and serial fashion. The working knot 4-1 is coupled to the host 2 through the interface 6 through which it receives host cryptography tasks and their associated data. The working knot 4-1 is coupled serially to the working knot 4-2 and so on. The working knot 4-1 performs cryptography on one of the tasks in its local workshop 10 and forwards the rest of the cryptography tasks to work knot 4-2 though its cascaded interface 13. The working knot 4-2 receives the rest of the cryptography tasks from working knot 4-1 through its device interface 11-2, performs cryptography on another one of the tasks and forwards the remainder of the tasks to the next working knot in the cascade and so on.

In one embodiment of the invention, the working knot 4-1 maintains status of the working knots 4, in the serial cascade, and sends an adequate number of tasks down in the cascade to try to keep employed all working knots that at the outset are not busy.

Figure 4:
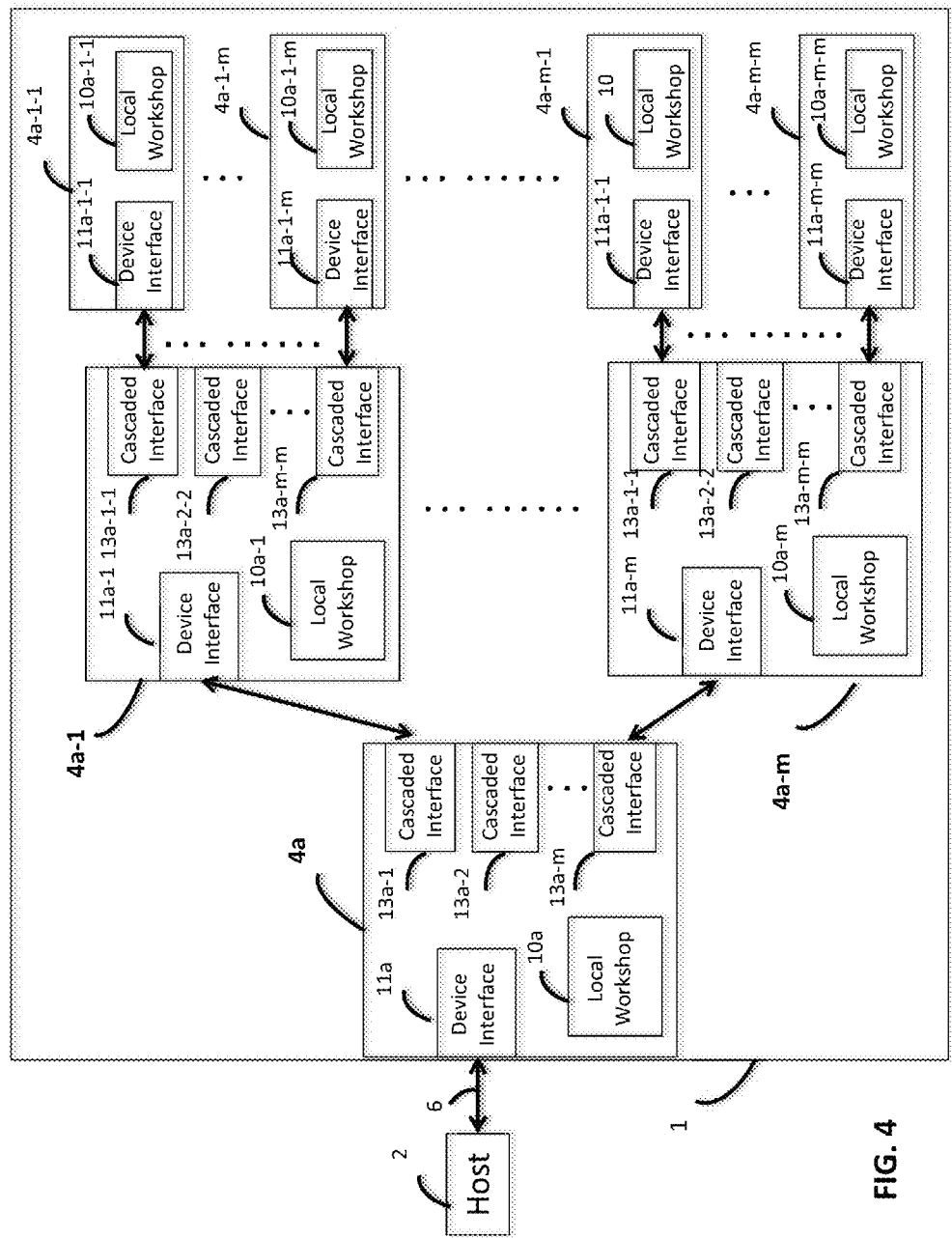
FIG. 4 shows an example of distributed cryptography system, in accordance with yet another embodiment of the invention.

FIG. 4 shows another example of a method and apparatus of the distributed cryptography system 1 employing working knots 4a. The distributed cryptography system 1 is shown to include a number of working knots 4a coupled to one another in a parallel fashion. The working knot 4a is coupled to the host 2 through the interface 6 receiving cryptography tasks and associated data therethrough.

The working knot 4a is shown coupled to 'm' number of working knots 4a-1 through 4a-m via interfaces 13-1 through 13-m, similarly, the working knots 4a-1 through 4a-m are each shown coupled to a respective 'm' number of working knots 4a-1-1 through 4a-1-m. The working knot 4a performs one or more cryptography tasks in its respective local workshop 10 and forwards the remaining cryptography tasks to working knots 4a-1 through 4a-m. The working knots 4a-1 through 4a-m in turn perform one or more of the received cryptography tasks and forward the rest to the remaining working knots 4a-1 through 4a-m and so on. The parallel coupling of the working knots 4a to one another reduces the propagation of the cryptography tasks amongst the working knots 4a and further improves the performance of the distributed cryptography system 1.

In one embodiment of the invention, the interface 13 of one working knot acts as a host or initiator to the next (or adjacent) working knot to which it is coupled and the next work knot similarly acts as the host or initiator to its subsequent working knot and so on until no further cryptography tasks need be performed. The device interface 11 of the working knot acts as a device or target for the previous-stage working knot. For example, referring to the embodiment of FIG. 3, the working knot 4-1 acts as a host to the next stage working knot 4-2 and so on. The device interface 11-2 acts as device or target for device interface 11-1 of the previous stage working knot 4-1.

In some embodiment of the invention, once a working knot completes its cryptography task, it sends the status and result of the task back to the working knot that had initially forwarded the task. This means if there are intermediate working knots, the status and task travel through them to get to the working knot that initially forwarded the task. The result and status are eventually routed back to the host 2.

Now referring to the example of FIG. 4, the working knot 4a-1-m sends the result and status of its tasks back to the working knot 4a-1 and working knot 4a-1 sends the same back to the working knot 4a. The working knot 4a either sends the same back to the host 2 or aggregates the result and status of several cryptography tasks before sending them back to the host 2.

In another embodiment of the invention, the working knot 4a keeps status of the working knots in the cascade and only sends enough tasks down the cascade to keep the working knots 4a-1 through 4a-m that are not busy performing any cryptography, busy.

In yet another embodiment of the invention, there are only a sufficient number of working knots 4a to keep up with the cryptography performance required of the distributed cryptography system 1 and all the 'm' cascaded interfaces 13 need not be coupled to another one of the working knots 4a.

Figure 5:
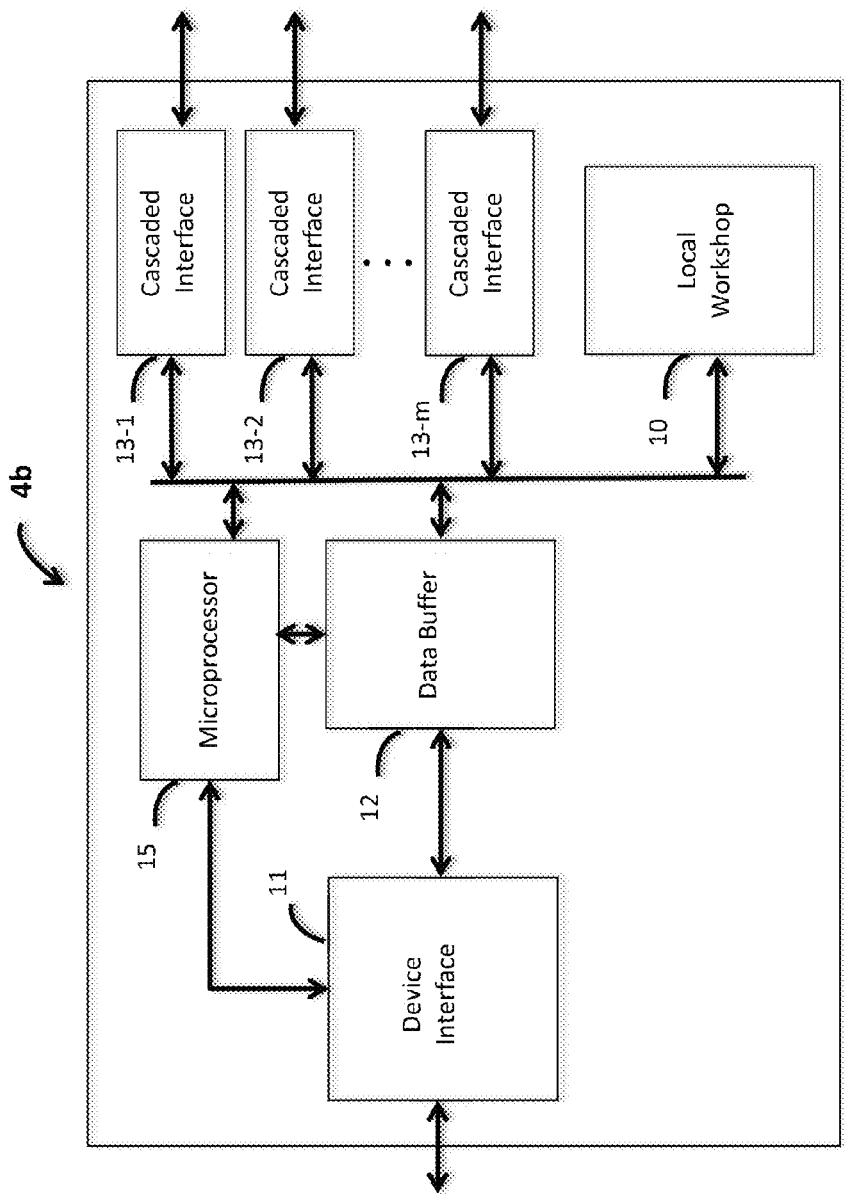
FIG. 5 shows example of working knot, in accordance with yet another embodiment of the invention.

FIG. 5 shows another example of the working knot 4b, in accordance with yet another embodiment of the invention. The working knot 4b is shown to further include a data buffer 12 and microprocessor 15, in accordance with an embodiment of the invention. The data buffer 12 is coupled to the device interface 11, local workshop 10, microprocessor 15, and cascaded interface 13-1 through 13-m. The combination of the data buffer 12 is used by the working knot 4b to receive host cryptography tasks and their associated data, processing some of the tasks, and transferring the rest to the working knots down the chain. The microprocessor 15 is shown to be coupled to the device interface 11, local workshop 10, data buffer 12, and cascaded interfaces 13-1 through 13-m. The microprocessor 15 manages flow of traffic through different structures of the working knot 4b and keeps track of the other working knots in the chain.

Figures 6, 6A:
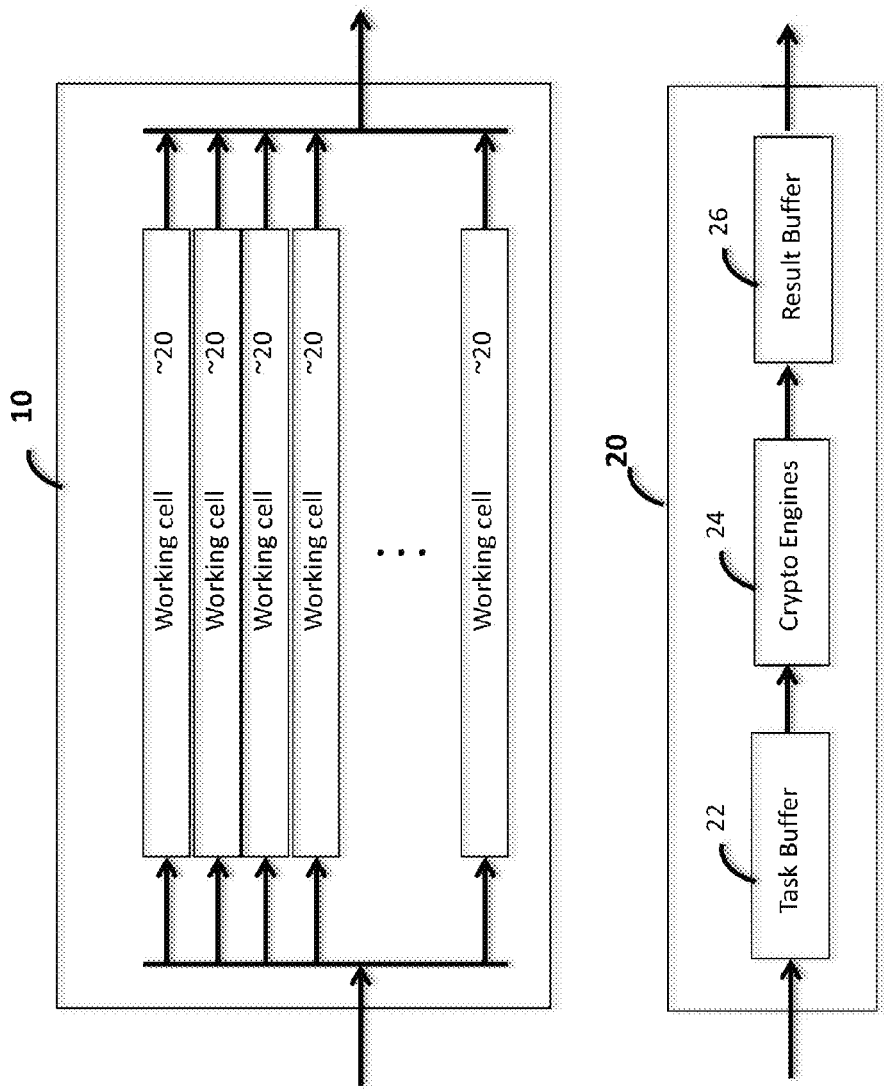
FIG. 6 shows an example of local workshop, in accordance with embodiment of the invention.
FIG. 6a shows an example of working cell, in accordance with embodiment of the invention.

FIG. 6 shows relevant details of the local workshop 10, in accordance with an embodiment of the invention. The local workshop 10 is shown to include a number of working cells 20 coupled to each other in parallel to accelerate the cryptography operations on the host data. Parallel working cells increase performance.

FIG. 6a shows relevant details of the working cell 20, in accordance with yet another embodiment of the invention. The working cell 20 is shown to include a task buffer 22, crypto engines 24, and result buffer 26. The task buffer 22 is coupled to the crypto engines 24 and the crypto engines 22 is coupled to the result buffer. The crypto engines 24 perform cryptography operation (s) on the data in the task buffer 22 and stores the result of the operation in the result buffer 26.

In one embodiment of the invention, the local workshop 10 is operable to perform cryptography such as symmetric-key cryptography, public-key cryptography, and hash functions. Exemplary symmetric-key cryptography are, without limitation, AES-128, AES-256, DES, or triple DES. The cryptographic hash function includes, without limitation, SHA-1, SHA-2, SHA-3, MD5, or any combination thereof. The pubic-key cryptography includes without limitatiob, Diffie-Hellman key exchange, RSA, DSA, or ECC. The local workshop 10, the working cell 20, or the crypto engine 24 is operable to perform, without limitation, any or all of the cryptography function required by the host.

Figure 7:
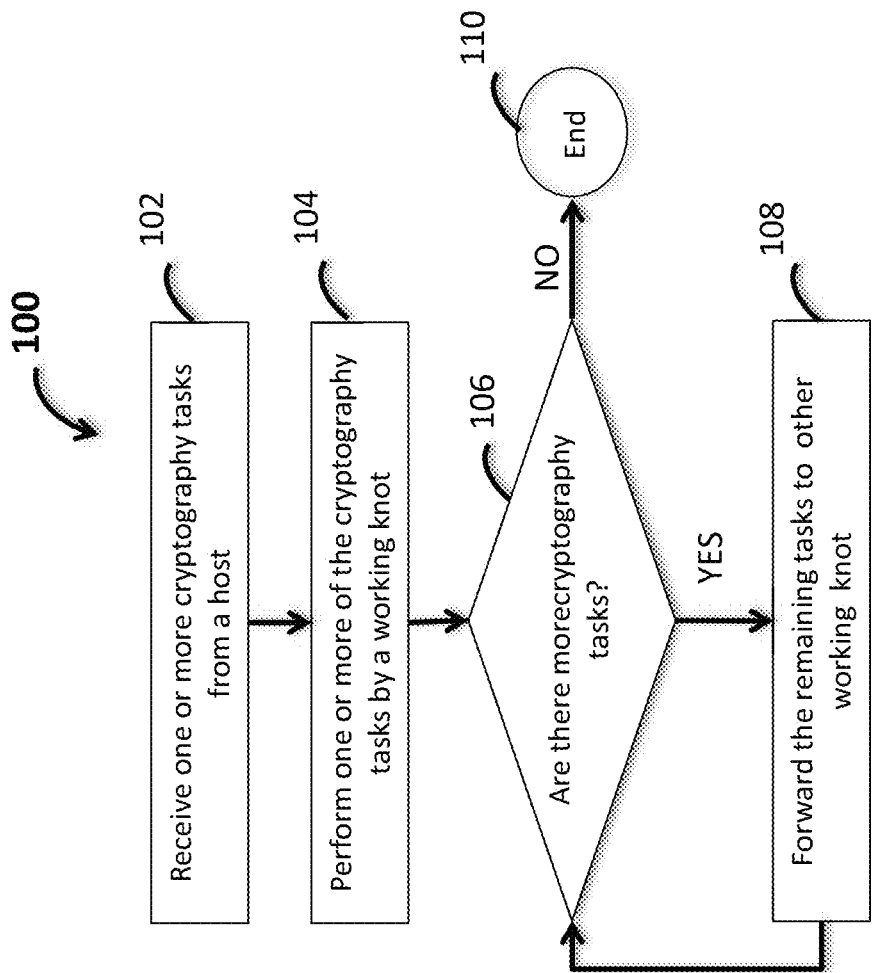
FIG. 7 shows a flow chart 100 of the relevant steps performed by distributed cryptography system.

FIG. 7 shows a flow chart 100 of the relevant steps performed by the distributed cryptography system 1, in accordance with a method of the invention. One of the working knots of distributed cryptography system 1 receives one or more cryptography tasks from a host 2 at step 102. Next, at step 104, one of the working knots of distributed cryptography system 1 performs cryptography on one or more of the tasks. At step 106, a determination is made as to whether or not there are more cryptography tasks. If there are more task; 'YES', the process moves to step 108. At step 108, the one of the working knots forwards the remaining tasks to the other working knots in the chain and the process move back to step 106. If at step 106, there are no remaining tasks to be dispatched to other working knot; 'NO', the process proceeds to step 110 where it ends.

Figure 8:
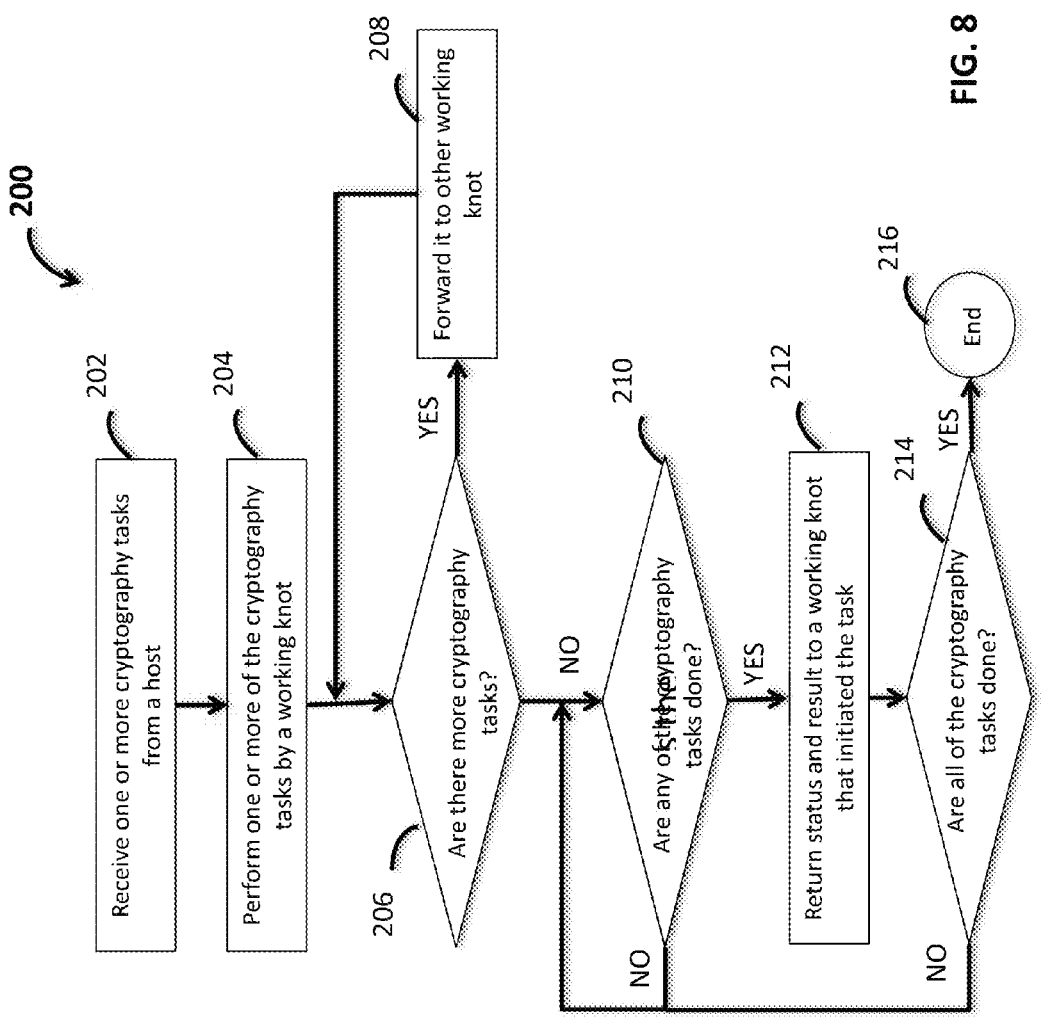
FIG. 8 shows a more detailed flow chart 200 of the relevant steps performed by distributed cryptography system.

FIG. 8 shows a more detailed flow chart 200 of the relevant steps performed by the distributed cryptography system 1, in accordance with a method of the invention. One of the working knots of distributed cryptography system 1 receives one or more cryptography tasks from a host 2 at step 202. Next, at step 204, the one of the working knots of distributed cryptography system 1 performs cryptography on one or more of the tasks. At step 206, a determination is made as to whether or not there are more cryptography tasks. If there are more task; 'YES', the process moves to step 208. At step 208, the one of the working knots forwards the remaining tasks to the other working knots in the chain and the process move back to step 206. If at step 206, there are no remaining tasks to be dispatched to other working knot; 'NO', the process proceeds to step 210, At step 210, a determination is made as to whether or not any of the cryptography tasks are completed. If one or more of the cryptography tasks are done by the working knots; 'YES', the process proceeds to step 212. At step 212, the working knots return the status and the result of the cryptography tasks to the working knots that initiated the tasks and the process proceeds to step 214. At step 210, if none of the tasks are completed; 'NO', the process waits at step 210 until at least one of the tasks is completed. At step 214, a determination is made as to whether or not all the cryptography tasks are done. If all the cryptography tasks are completed; 'YES', the process ends at step 216. At step 214, if all the tasks are not completed; 'NO', the process proceeds to step 210 where it waits for completion of at least one of the task.

In some embodiment of the invention, a local workshop of a working knot may be operable to perform a number of cryptography tasks simultaneously.

Although the description has been described with respect to particular embodiments thereof, these particular embodiments are merely illustrative, and not restrictive.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What we claim is:

1. A distributed cryptography system comprising:
a plurality of working knots including,
a data buffer configured to save a cryptography task,
a local workshop, the device interface of each of working knots being coupled to a respective local workshop and a respective cascaded interface within each of the plurality of working knots,
wherein at least one of the working knots configured to communicate with a host through a respective device interface to receive cryptography tasks, the at least one of the working knots being responsive to one or more cryptography tasks configured to forward at least one thereof to a remaining working knot of the plurality of working knots through a respective cascaded interface, the at least one remaining working knot being responsive to one of the one or more of the cryptography tasks while the at least one of the working knots is performing another of the one or more cryptography tasks, wherein each of the remaining working knots is operable to forward a cryptography task of the one or more cryptography tasks to a next working knot, through a respective cascaded interface, while at least one of a remaining cryptography tasks of the one or more cryptography tasks is being performed by a preceding one of the remaining working knots, wherein each of the local workshop further includes one or more working cells, each of the one or more working cells performs cryptography concurrently with remaining one or more working cells, wherein the one or more working cells include a task buffer, one or more crypto engines, and a result buffer.

2. The distributed cryptography system of claim 1, wherein an additional number of working knots of the remaining working knots being operable to forward the cryptography tasks to the remaining plurality of working knots.

3. The distributed cryptography system of claim 1, wherein the microprocessors of each of the plurality working knots are configured to maintain track of a busy status of a corresponding working knot.

4. The distributed cryptography system of claim 3, wherein each of plurality of working knots forwards a cryptography task to the adjacent plurality of working knot that is not busy.

5. The distributed cryptographic engine of claim 1, wherein the plurality of working knots forward the cryptography tasks to one another in a cascading fashion.

6. The distributed cryptography system of claim 5, wherein the plurality of working knots forward the cryptography tasks only to working knots that are not busy.

7. The distributed cryptography system of claim 1, wherein the plurality of working knots are operable to perform the cryptography tasks.

8. The distributed cryptography system of claim 1, wherein the cryptography tasks includes symmetric-key cryptography, cryptographic hash function, public-key cryptography, or any combination thereof.

9. The distributed cryptography system of claim 8, wherein the symmetric-key cryptography includes advanced encryption standard (AES), data encryption standard (DES), and triple (DES), or any combination thereof.

10. The distributed cryptography system of claim 8, wherein the cryptographic hash function includes SHA-1, SHA-2, SHA-3, MD5, or any combination thereof.

11. The distributed cryptography system of claim 8, wherein the pubic-key cryptography includes Diffie-Hellman key exchange, RSA, DSA, and ECC.

12. The distributed cryptography system of claim 1, wherein each of the plurality of working knots further includes a microprocessor and a data buffer, the cryptography tasks being performed by a respective microprocessor and saved by a respective data buffer.

13. The distributed cryptography system of claim 1, wherein the device interface is PCIe, SATA, SAS, IEEE1394, SD, eMMC or SPI-compliant.

14. The distributed cryptography system of claim 1, wherein the device interface communicates with the host through a PCIe compliant bus or USB-compliant.

15. The distributed cryptography system of claim 1, wherein the host includes a PCIe compliant host controller or USB compliant host controller.

16. The distributed cryptography system of claim 1, wherein each of the at least one cascaded host of a working knot is operable to communicate with a device interface of another working knot to transfer the cryptography tasks therebetween.

17. The distributed cryptography system of claim 1, wherein the local workshop is operable to perform the cryptography tasks.

\* \* \* \* \*